Dec. 1, 1970            R. L. GLICK            3,543,519
VORTEX INJECTION SYSTEM TO CONTROL THE THRUST
OF SOLID PROPELLANT ROCKET MOTORS
Filed Jan. 2, 1968

Robert L. Glick INVENTOR.

BY

ATTORNEY

United States Patent Office 3,543,519
Patented Dec. 1, 1970

3,543,519
VORTEX INJECTION SYSTEM TO CONTROL THE THRUST OF SOLID PROPELLANT ROCKET MOTORS
Robert L. Glick, Columbus, Ind., assignor to Thiokol Chemical Corporation, Bristol, Pa., a corporation of Delaware
Filed Jan. 2, 1968, Ser. No. 695,058
Int. Cl. F02k 9/04, 9/06
U.S. Cl. 60—254                                1 Claim

ABSTRACT OF THE DISCLOSURE

A vortex injection system to control the thrust of solid propellant rocket motors, that utilizes the gas created by a gas generator to effect a swirl in the products of combustion of the solid propellant in the solid propellant rocket motor by injecting the gas created by the gas generator into the solid propellant rocket motor in a substantially tangential direction, in relation to the longitudinal axis of the solid propellant rocket motor.

BACKGROUND OF THE INVENTION

Field of the invention

The modulation of the thrust of a solid propellant rocket motor is a problem or a requirement that has attempted to be solved for a considerable period of time. One of the solutions envisioned by the rocket industry is the controlling of the burning rate of the solid propellant, in the rocket motor, once it has been ignited in a conventional manner.

It was determined therefore that if the burning rate of the solid propellant in the rocket motor, could be increased or decreased at will, the thrust of the solid propellant rocket motor could be modulated. Several procedures have been tried to control the burning rate of the solid propellant and thus the thrust of the solid propellant rocket motor and it was determined that the introduction of a secondary gas into the solid propellant rocket motor in a direction tangential to the longitudinal axis of the solid propellant rocket motor, so as to effect a swirling "vortex" flow in the products of combustion of the solid propellant rocket motor would create at the center of the solid propellant near the axis of the vortex, a coning action in the burning surface of the solid propellant and thus increase the area of the burning surface and in turn give a variable thrust to the solid propellant rocket motor.

Description of the prior art

In some instances spinning solid propellant rocket motors by means of special hardware has increased the burning rate of such motors but the addition of such hardware increases both the weight and cost of production of such motors and cannot be employed generally. Choking of the nozzle by a swirling flow so that the mass flow of the combustion gases of the solid propellant will be altered and will also regulate thrust. However, this puts a roll torque on the motor that may be undesirable. Other procedures for increasing the burning rate of the solid propellant have been observed but such procedures do not depend on the swirling action achieved by the instant invention. Therefore, such procedures are not considered to be analogous to the present invention.

SUMMARY OF THE INVENTION

The present invention therefore relates to improvements in vortex injection systems for solid propellant rocket motors whereby a gas generator creates a gas swirl that is introduced into a solid propellant rocket motor in a direction tangential to the longitudinal axis of the rocket motor to increase the burning rate of the solid propellant in the rocket motor by interaction of the swirl vortex with the burning propellant surface and thus cause the thrust of the solid propellant rocket motor to be controlled and varied during the flight of the solid propellant rocket motor.

It is a known fact that increasing the magnitude of the gas swirl created by the gas generator will augment the severity of the swirl vortex-propellant interaction thereby amplifying the coning of the burning surface of the solid propellant and result in a faster "effective" burning rate for the solid propellant. The effect of increasing the magnitude of the gas swirl as set forth, will also increase the thrust of the solid propellant rocket motor and if the magnitude of the gas swirl is controlled the thrust of the solid propellant rocket motor will be modulated.

It will be apparent therefore that the overall performance of the system embodying the invention would be equal to or greater than the magnitude that results from either one of the increases as set forth, thus the range of the control of the thrust of the solid propellant rocket would also be increased.

The advantages of the instant invention would therefore include increased thrust control range, high mass fraction during the burning of the solid propellant, all of the solid propellant in the combustion chamber in the solid propellatn rocket motor would be consumed and any conventional solid propellant could be employed to achieve the improved results obtained by utilization of the instant invention.

It is also possible within the scope of the invention to provide more injection nozzles in the system and thus increase the burning rate at several locations instead of at just one location. Thus it is within the perview of this invention to cause the gas generator to increase the number of injections that may be introduced into the solid propellant rocket motors.

It is an object of the invention therefore to provide a vortex injection system for solid propellant rocket motor whereby a gas swirl introduced into a solid propellant rocket motor by a gas generator in a direction tangential to the longitudinal axis of the solid propellant rocket motor will increase the burning rate of the solid propellant and thus achieve modulation of the thrust of the solid propellant rocket motor.

With the above and other objects and advantages as will appear to one skilled in the art, the invention consists of the novel arrangement of parts more fully hereafter described and illustrated in the accompanying drawing in which:

DESCRIPTION OF THE PREFERRED EMBODIMENTS

Figure 1:
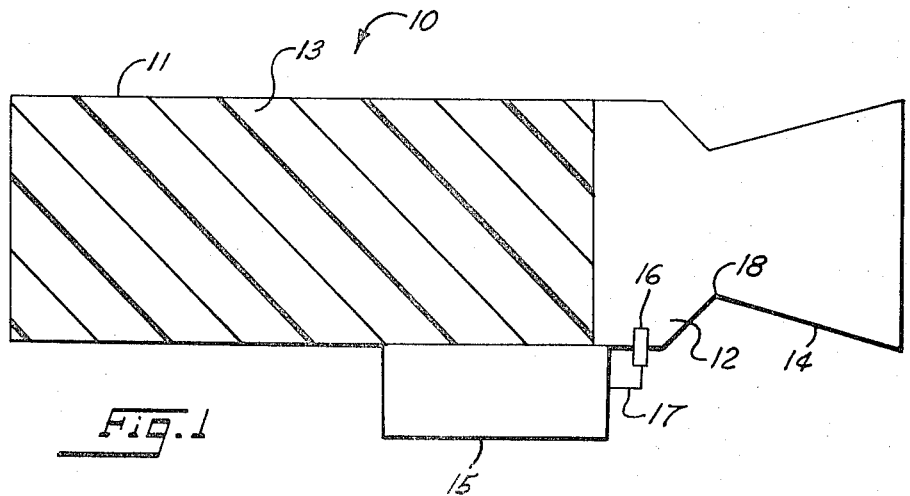
FIG. 1 is a schematic view of a solid propellant rocket motor illustrating the manner of mounting one form of the invention thereon.

Referring more in detail to the drawing and especially to FIG. 1 thereof in which like parts are designated by like reference numerals, the reference numeral 10 is used to generally designate a rocket motor of conventional structure.

The rocket motor 10 includes a motor case 11 that provides a combustion chamber 12 in which is cast a solid propellant 13, as is conventional, a nozzle 14 is mounted to the motor case 11 at the aft end thereof and has communication with the combustion chamber 12 so that the products of combustion created by the burning of the solid propellant 13 may exit through the nozzle 14.

A variable rate gas generator 15 of the conventional structure is rigidly secured to the outer surface of the motor case 11 and has a swirl injector 16 also of conventional structure, connected thereto by a suitable conduit 17. The swirl injector 16, extends through the wall of the motor case 11 to be positioned forward of the throat 18 of the nozzle 14 as shown in FIG. 1.

The discharge of gas created in the variable rate gas generator is controlled by a conventional control system that is mounted on the motor case 11 or from a ground system that remotely controls the operation of the variable rate gas generator 15 in any well known manner.

Figure 2:
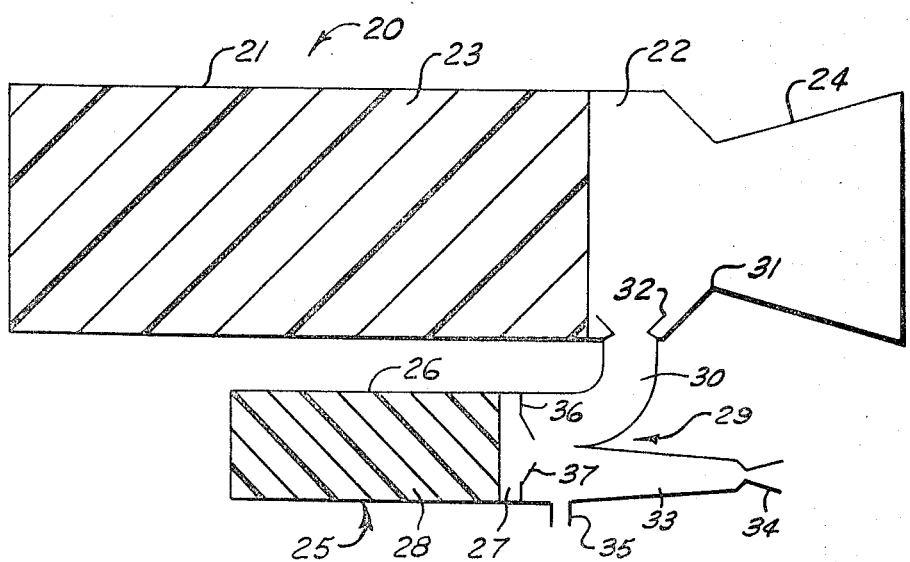
FIG. 2 is a view similar to FIG. 1 illustrating the manner in which another form of the invention is also mounted on the solid propellant rocket motor.

In referring to FIG. 2 there is shown a conventional rocket motor 20 which includes a motor case 21 that provides a combustion chamber 22 in which is cast a solid propellant 23. As is conventional, a nozzle 24 is connected to the motor case 21 at the aft end thereof and has communication with the combustion chamber 22 so that the products of combustion created by the burning of the solid propellant 23 may exit through the nozzle 24.

A constant pressure gas generator 25 is provided and any suitable mounting means may be utilized to mount the constant pressure gas generator 25 on the motor case 21. The constant pressure gas generator 25, similar to the rocket motor 20, comprises a case 26 which provides a combustion chamber 27 in which is cast a solid propellant 28. A bistable valve 29 is connected to the aft end of the constant pressure gas generator and a goose shaped neck 30 extends into the motor case 21 forwardly of a throat 31 in the nozzle 24. The end of the goose shaped neck 30 that extends into the motor case 21 and terminates in the combustion chamber 22, and has communication therewith, is provided with a swirl injector 32.

The bi-stable valve 29 also has a rearwardly extending neck 33 that is provided at its aft end with a nozzle 34 and a control jet 35 has communication with the bi-stable valve 29 forwardly of the junction of the neck 30 and 33.

A circular flow control plate 36 having inclined fins 37 thereon is positioned in the case 26 aft of the burning surface of the solid propellant 28 and forwardly of the control jet 35 and the control plate 36 effects the flow of the combustion gases, exiting from the combustion chamber 27, that are created by the burning of the solid propellant 28.

The operation of the constant pressure gas generator 25 is controlled by a conventional control mounted on the case 26 or may be remotely controlled by a ground control system of conventional design. The control jet 35 is similarly controlled and the control jet 35 is utilized to direct the products of combustion created by the burning of the solid propellant 28 into the goose shaped neck 30 of the bi-stable valve 29.

In both forms of the invention the injection created by the swirl injectors 16 and 32 is introduced into the motor cases 11 and 21 in a direction that is tangential to the longitudinal axis of the motor cases 11 and 21 and such injection will be directed into the motor cases 11 and 21 upon command by either of the control systems previously described.

Thus if during the flight of either of the rocket motors 10 and 20 it is determined that the thrust of each motor is to be modulated, the operation of either of the gas generators after ignition, results in full control of the thrust and the modulation of the thrust of each of the rocket motors.

The operation of each form of the invention is similar and the results obtained thereby are also similar and it is believed that the operation and structure of both forms of the invention will be understood by one skilled in the art. It also being understood that certain variations in the mode of operation as well as the structure thereof may be adhered to provide such variations fall within the spirit of the invention and the scope of the appended claim.

Having thus described the invention what is claimed as new and desired to be secured by Letters Patent is:

1. An injection system for controlling the modulation of the thrust of a solid propellant rocket motor, including a motor case having a combustion chamber therein, a nozzle having a throat in communication with the combustion chamber and a solid propellant in the combustion chamber, comprising a gas generator, a bi-stable valve connected to the aft end of said gas generator, a goose-shaped neck securing said bi-stable valve and said gas generator to said motor case, said goose-shaped neck being secured to said motor case forwardly of the throat in the nozzle, a swirl injector at the end of the goose-shaped neck that is secured to said motor case, a rearwardly extending neck for said bi-stable valve forming a junction at one end with the end of the goose-shaped neck connected to said generator, a nozzle for said rearwardly extending neck, a control jet for said rearwardly extending neck forwardly of the junction of said goose-shaped neck and said rearwardly extending neck, a circular flow control plate having inclined fins positioned in said gas generator forwardly of said control jet whereby gas generated in the gas generator is introduced into the combustion chamber of the motor case in a direction that is tangential to the longitudinal axis of the motor case.

References Cited
UNITED STATES PATENTS

| | | | |
|---|---|---|---|
| 3,102,386 | 9/1963 | Proell | 60—254 XR |
| 3,136,119 | 6/1964 | Avery | 60—251 XR |
| 3,142,152 | 7/1964 | Sessums | 60—251 |
| 3,285,262 | 11/1966 | Ernst et al. | 60—231 XR |
| 3,345,822 | 10/1967 | Povinelli | 60—254 XR |
| 3,434,287 | 3/1969 | Caveny | 60—254 XR |

CARLTON R. CROYLE, Primary Examiner

U.S. Cl. X.R.

60—224